(12) United States Patent
Aho et al.

(10) Patent No.: US 6,787,205 B1
(45) Date of Patent: Sep. 7, 2004

(54) COATED PAPERBOARD PROCESS FOR MANUFACTURING THE SAME AND PRODUCTS OBTAINED THEREOF

(75) Inventors: Yrjö Aho, Rauha (FI); Tapani Penttinen, Huutjärvi (FI); Risto Salminen, Karhula (FI); Bruce Foster, Oxford, CT (US)

(73) Assignee: Stora Enso Oyj, Helsinki (FI)

( * ) Notice: Subject to any disclaimer, the term of this patent is extended or adjusted under 35 U.S.C. 154(b) by 0 days.

(21) Appl. No.: 09/830,869
(22) PCT Filed: Nov. 1, 1999
(86) PCT No.: PCT/FI99/00910
§ 371 (c)(1),
(2), (4) Date: Oct. 10, 2001
(87) PCT Pub. No.: WO00/26025
PCT Pub. Date: May 11, 2000

(30) Foreign Application Priority Data
Nov. 2, 1998 (FI) .................................................. 982372

(51) Int. Cl.⁷ .......................... B32B 27/08; B32B 27/10; B32B 27/20; B32B 27/36; B32B 31/30
(52) U.S. Cl. ..................... 428/34.2; 428/35.7; 428/212; 428/219; 428/311.1; 428/340; 428/341; 428/342; 428/481; 428/507; 428/511; 428/537.5; 428/480; 206/557; 220/573.1; 220/912; 156/244.11
(58) Field of Search .............................. 428/34.2, 272, 428/311.11, 480, 481, 425.1, 452, 474.3, 474.6, 485, 486, 507, 511, 537.5; 206/557; 228/912

(56) References Cited

U.S. PATENT DOCUMENTS

| | | | |
|---|---|---|---|
| 4,041,206 A | | 8/1977 | Tsunashima et al. |
| 4,147,836 A | * | 4/1979 | Middleton et al. .......... 428/481 |
| 4,362,775 A | * | 12/1982 | Yabe et al. .................. 428/213 |
| 4,419,507 A | * | 12/1983 | Sublett ........................ 528/302 |
| 4,455,184 A | | 6/1984 | Thompson |
| 5,484,632 A | * | 1/1996 | Mercer, Jr. et al. ........ 428/35.7 |
| RE35,939 E | * | 10/1998 | Fukuda et al. ............ 528/308.6 |
| 5,817,384 A | * | 10/1998 | Furuta et al. .............. 428/1.55 |
| 5,846,642 A | * | 12/1998 | Kimura et al. .............. 428/323 |
| 6,207,289 B1 | * | 3/2001 | Hoffmann et al. .......... 428/481 |
| 6,306,501 B1 | * | 10/2001 | Furuta et al. ............. 428/411.1 |

FOREIGN PATENT DOCUMENTS

| | | |
|---|---|---|
| EP | A2215630 | 3/1987 |
| EP | A1685332 | 12/1995 |
| JP | 0-116484 | * 4/1994 |

* cited by examiner

*Primary Examiner*—Vivian Chen
(74) *Attorney, Agent, or Firm*—Birch, Stewart, Kolasch & Birch, LLP

(57) ABSTRACT

The invention relates to a coated food paperboard (1), to the manufacturing process and use of the same, and to products obtained thereof. The paperboard (1) comprises one or several fibre material layers (2), such as a three-layer structure consisting of a middle layer (4) of a mixture of sulphate pulp and CTMP and of sulphate pulp layers (5) on both sides of it, and of a polymeric coating (3) getting into contact with food, either on one side or on both sides of the paperboard. According to the invention, the coating (3) consists of an outer layer (6), the melting point of the polymer used in which is at least 230° C., and of an inner layer (7) placed against the fibre material layer (5); in this inner layer, a polymer with a melting point of at least 230° C. is blended with another adhesive polymer, the melting point of which is 130–185° C. Further, the inner layer (7) may be provided with mineral substance, such as calcium carbonate. In accordance with the invention, the paperboard (1) is manufactured by coextrusion of superimposed polymeric layers (6, 7). The paperboard (1) of the invention is suitable for liquid packaging or oven board, and products manufactured of the paperboard comprise especially oven dishes and consumer packages for food, which include the dish and which may be heated as such.

21 Claims, 1 Drawing Sheet

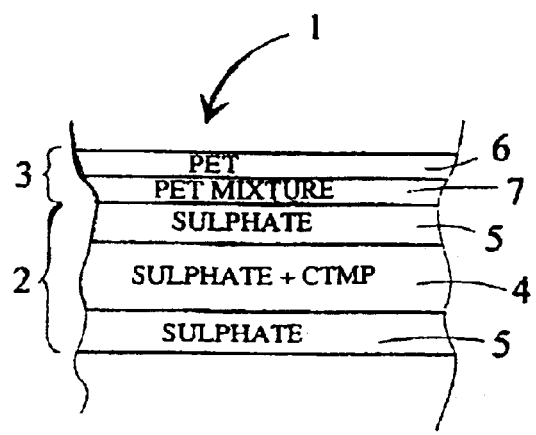
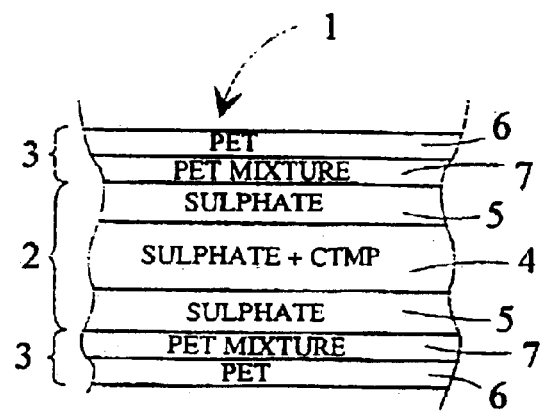
Fig 1.
Fig 2.
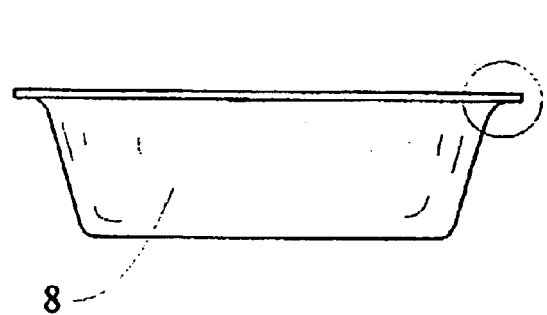
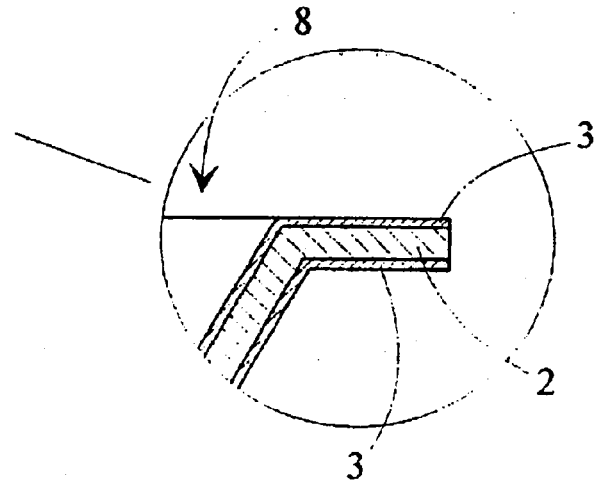
Fig 3.
Fig 4.

US 6,787,205 B1

COATED PAPERBOARD PROCESS FOR MANUFACTURING THE SAME AND PRODUCTS OBTAINED THEREOF

This application is the national phase under 35 U.S.C. § 371 of PCT International Application No. PCT/FI99/00910 which has an International filing date of Nov. 1, 1999, which designated the United States of America and was published in English.

FIELD OF THE INVENTION

The present invention relates to a coated paperboard for food, comprising one or more layers of fibre material and a heat-resistant polymeric coating, which gets into contact with food. Further, the invention relates to the manufacturing process and use of such a paperboard, and to a number of products obtained therefrom.

BACKGROUND OF THE INVENTION

A heat-resistant oven board is used as material for such food dishes and packages, which have to withstand heating in a common or microwave oven. A typical heatable food dish is an oven dish, which may be used as part of a finished package for heatable food, but which may also be marketed to consumers as a separate product. The polymeric coating of an oven board makes the paperboard water and grease resistant, and the polymer has to withstand the temperatures used in heating, typically at least 230° C.

It has been known to use polypropylene or polyesters, such as polyethylene terephthalate (PET) as coating for oven boards. The problem with some of these known polymers has been insufficient heat resistance. Another problem relating to all polyesters used as coatings is the poor adhesion of the polymer to the paperboard. In order to achieve sufficient adhesion, the coating has to be spread onto the paperboard in layer thicknesses which are at least approx. 35–40 g/m². If the layer is thinner, there is a danger of it coming off, for example, due to vapour released from the paperboard. The use of possible binding agents improving the adhesion has been restricted by their poor heat resistance. Pin holes are also easily left in a thin polymeric layer.

Polyesters as such, and especially PET with a high melting point, are very well adapted to be used as coatings for oven paperboard. These polymers are compatible with food, because of their sufficient mechanical strength and heat resistance, and because their organoleptic advantageousness is kept at oven temperatures, they are heat-sealable and they may be spread onto the paperboard by extrusion. The only problem is caused by layer thicknesses which indicate a high material consumption and high amounts of polymer contained in the waste taken to dumping areas or material recycling. The need for reduction in polymer consumption is especially emphasised as even stronger and thinner fibre bases for paperboard have been developed and as the norms concerning waste take into account also the relative amount of polymer compared with fibre material included, besides the absolute amount.

SUMMARY OF THE INVENTION

The object of the present invention is to form a coated paperboard, in which the adhesion of the polymeric coating to the paperboard has been improved, while simultaneously making the coating thinner and less prone to hole formation as before. It is characteristic of the paperboard of the invention that it is formed of superimposed polymeric layers, comprising an outer layer in which the melting point for the polymer used is at least 230° C., and an inner layer placed against the fibre material layer, the inner layer including polymer with a melting point of at least 230° C. blended with another polymer achieving adhesion between the coating and fibre material, the melting point of this polymer being 130–185° C.

The outer layer of the two-layer polymeric coating of the paperboard of the invention contacting the food thus comprises a heat-resistant polymer with the necessary oven properties and preferably consisting of some known coating polymer for oven boards that has been tested in use. According to the invention, adhesion of the outer polymeric layer to the paperboard, i.e. to the fibre material layer below, is achieved by an inner adhesion layer in which another adhesive polymer with a lower melting point has been blended with the heat-resistant polymer. Because of the heat-resistant polymer melting at or above 230° C, the inner layer withstands heating in a stove or microwave oven at the same time as it is modified by said polymer melting at lower temperatures so that its adhesion to the fibre material is substantially better than before. Due to improved adhesion, the two-layer polymeric coating for the paperboard of the invention may be produced with a considerably smaller amount of polymer, even when added together, than the previous one-layer coatings for oven paperboards.

Besides oven boards, the paperboard of the invention is also applicable to liquid packaging boards, e.g. drinking cups and other disposable dishes, due to its compatibility with food and its heat-sealability.

The mixture ratio of polymers in the inner coating layer of the paperboard of the invention preferably is within the range of 85–97% of polymer with a higher melting point ($\geq$230° C.) and 3–15% of adhesive polymer with a lower melting point (130–185° C.). The polymer with the higher melting point is most preferably the same polymer as has been used in the outer layer of the coating.

A preferable polymer to be used in the outer coating layer and also as the second polymeric component of the inner coating layer is polyethylene terephthalate, such as Eastapak PET copolyester with a melting point of 240° C., manufactured by Eastman Chemical Company, or Eastapak PET polyester 12440, manufactured by the same company. In PET-based copolyesters, comonomers used in relatively small amounts (approx. 1–10%) may comprise, for example, cyclohexane dimethanol (CHDM) or isophthalic acid (IPA), which improve the processability of the polymer. Other polymers may comprise polybutene terephthalate, polyethylene glycol-modified polyethylene terephthalate (PETG), polyethylene naphthalene (PEN), and polypenthene, which, used as such, all adhere poorly to fibre material; but the problem of adhesion related with these may be solved with a two-layer coating of the present invention.

The adhesive polymeric component melting at 130–185° C. for the inner coating layer may preferably comprise a terephthalate-based copolyester which especially well both blends with and binds to said polyethylene terephthalate melting at or above 230° C. An example of such polymers is Eastobond copolyester 19411 manufactured by Eastman Chemical Company, in which the used comonomer is diethylene glycol (DEG), reducing the crystallinity of the polymer and increasing the polarity due to its OH groups, these factors improving the adhesion between the polymer and the paperboard.

The invention is firer applicable in an advantageous way so that, besides the two polymeric components, the inner coating layer is provided with fine mineral substance. It has been noted that mineral substance facilitates the coextrusion of polymeric layers onto paperboard and makes it possible for the polymeric layer to be even thinner than before. An especially suitable mineral is, for example, calcium carbonate but, for example, also titanium oxide or talcum are usable. When using a mineral component, the composition of the inner coating layer may preferably vary within the range of 80–90% of polymeric component melting at a higher temperature ($\geq 230°$ C.), 3–10% of adhesive polymeric component melting at a lower temperature (130–185° C.), and 5–15% of mineral substance.

The total weight of a two-layer polymeric coating of the paperboard of the invention is preferably at most 25 g/m$^2$, most preferably 15–22 g/m$^2$. By using said mineral substance as part of the inner layer, the total weight of the coating may be in an even lower range, i.e. 13–22 g/m$^2$.

The fibre base for the paperboard of the invention preferably consists of a three-layer paperboard, in which the middlemost layer is a thicker layer of a mixture of chemical pulp and CTMP, and the layers on both sides of this layer substantially consist of pure chemical pulp. The polymeric coating may be spread either on only one side or both sides of the paperboard.

It is characteristic of the method for manufacturing a coated paperboard of the invention that the polymer forming the outer layer of the coating and the polymeric mixture forming the inner layer are together coextruded onto a moving paperboard web. Extrusion is followed by rapid cooling during which the polymer remains in an amorphic state so that it is heat-sealable. Most preferable for coextrusion is a layer combination in which the outer layer to be placed onto the paperboard consists of polyethylene terephthalate, such as said PET polyester 12440 or PET copolyester 9921, the inner layer comprising a mixture of polyethylene terephthalate, such as either of the said products, of a terephthalate-based copolyester, such as the said Eastman copolyester 19411, and of calcium carbonate. However, in the applications of the process, the layers to be coextruded may vary, as is apparent of the above description of the paperboard of the invention.

Products to be manufactured of the paperboard of the invention comprise, above all, paperboard oven dishes for heating food in a common or microwave oven. For protecting the paperboard base of the dish and for preventing the food from sticking to the dish, the polymeric coating of the paperboard has to be provided at least to the interior surface of the dish. However, it is preferable to provide both the interior and exterior surface of the dish with a polymeric coating, in which case the paperboard is also protected from possible spatters and grease in the baking plate.

The oven dish of the invention may be formed of paperboard coated with polymer either by pressing or, alternatively, by folding and joint sealing the folds thus produced to the exterior surface of the dish. In either case, the polymeric coating withstands the joint sealing and other moulding measures without hole formation or breaking.

According to the invention, the oven dish may form part of a finished package for food, the package and its contents being heatable as such in a stove or microwave oven. Besides the dish and the heatable food packed into it, such a package comprises a separate protective cover or wrapping, which is removed before heating, when necessary.

As mentioned above, the paperboard of the invention is also usable in products manufactured of liquid packaging board, such as disposable cups, plates and packages. Here the advantage of polyesters, such as PET, is that they are heat-sealable and that they do not give any taste or smell to foods in contact with them. With the invention, it has been possible to improve the mutual adhesion of PET and paperboard and to reduce the thickness of the PET layer.

The invention further comprises the use of the coated paperboard described above as oven board or as liquid packaging board and, especially, the use of it as part of a consumer package shaped as a dish, containing heatable food.

BRIEF DESCRIPTION OF THE DRAWINGS

The invention is next described in more detail with the help of examples, referring first to the enclosed drawings, in which FIG. 1 is a schematic view of a polymer-coated paperboard of the invention;

FIG. 2 is a schematic view of a second paperboard of the invention;

FIG. 3 shows an oven dish manufactured of paperboard of FIG. 2; and

FIG. 4 shows on enlarged scale a section of the wall structure of a dish in accordance with FIG. 3 at the edge of the dish.

DETAILED DESCRIPTION OF THE INVENTION

In FIG. 1, there is shown the layer structure of paperboard 1, the other side of which is provided with a polymeric coating. The fibre layers of the paperboard are together referred to with the reference number 2 and the polymeric coating with the reference number 3 in the figure.

The fibre layers 2 consist of a three-layer paperboard, the thicker middle layer 4 of which is a mixture of sulphate pulp and CTMP, the outer layers 5 on the both sides of the middle layer consisting of sulphate pulp. The share of the middle layer 4 of the weight of the fibre layers 2 is approx. 60%, and the share of both the said sulphate pulp layers 5 is approx. 20%. The total weight of the fibre layers 2 without the coating layers may be approx. 200–400 g/m$^2$, for example, approx. 225 g/m$^2$. When necessary, filler (not shown) may be used on the surfaces of the three-layer paperboard. In FIG. 1, the polymeric coating 3 consists of an outer layer 6, in which a polymer compatible with food has been used, the melting point of which is at least 230° C., and of an inner layer 7 coextruded with the outer layer, the inner layer comprising a polymer, the melting point of which is at least 230° C., blended with another adhesive polymer with a melting point of 130–185° C. Besides the said polymeric components, the inner layer 7 may contain a fine mineral substance, such as calcium carbonate. The polymeric coating 3 may consist of an outer layer 6 of for example, polyethylene terephthalate with a melting point of 240° C., and of an inner layer 7, which includes a mixture of 80–90% of the same polyethylene terephthalate as in the outer layer, 3–10% of adhesive terephthalate-based copolyester with a melting point of 159° C., and 5–15% calcium carbonate. The added weight of the layers 6, 7 of the polymeric coating 3 then is preferably 13–20 g/m$^2$.

The coated paperboard of FIG. 2 is structurally similar to that shown in FIG. 1, with the exception that its both sides are provided with polymeric coating 3. The fibre layers 2 are thus formed of a similar three-layer paperboard as in the application in FIG. 1, and also the materials and weight of the polymeric coatings 3 on both sides of the paperboard 1 may correspond to those shown in FIG. 1. The paperboard of both FIG. 1 and FIG. 2 is suitable to be used as material for oven dishes; in this case, the paperboard of FIG. 1 has the advantage that the amount of polymer in relation to fibre material is smaller, and the advantage of the application in FIG. 2 is that the paperboard is better protected from moisture and grease.

In FIG. 3, there is shown an oven dish manufactured of the paperboard of FIG. 2, which, for example, is suitable for a package for ready-prepared foods. The dish 8 thus comprises a polymeric coating 3 both on its interior and exterior surface, as is shown in FIG. 4.

EXAMPLES

Example 1

One side of a three-layer paperboard with a weight of 295 g/m$^2$ and propagation speed of 300 m/min, was provided by coextrusion with a top layer of Eastapak PET copolyester 9921 and with an inner layer comprising a mixture of 80 weight % of Eastapak PET copolyester 9921, 10 weight % of adhesive Eastobond copolyester 19411, and 10 weight % of calcium carbonate. The extrusion temperature was 290° C. and the air gap, i.e. the distance of extrusion nozzles from the paperboard web, was 18 cm. The weight of both the extruded polymeric layers was 11 g/m$^2$, i.e. the total weight of the two-layer coating thus obtained was 22 g/m$^2$.

Examples 2–4

The procedure of Example 1 was followed with the exception that the weights of the layers extruded in weight ratio 1:1 were 10 g/m$^2$, 9 g/m$^2$ and 8 g/m$^2$, and, respectively, the total weights of the two-layer coating were 20 g/m$^2$, 18 g/m$^2$ and 16 g/m$^2$.

Example 5

A two-layer coating was coextruded on both sides of a three-layer paperboard with a weight of 295 g/m$^2$ and propagation speed of 300 m/min, the top layer of the coating comprising Eastapak PET copolyester 9921 and the inner layer being a mixture of 80 weight % of Eastapak PET copolyester 9921, 10 weight % of adhesive Eastobond copolyester 19411, and 10 weight % of calcium carbonate. The extrusion temperature was 290° C. and the air gap, i.e. the distance of extrusion nozzles from the paperboard web, was 18 cm. The weight of each of the extruded polymeric layers was 11 g/m$^2$ so that a two-layer coating with a total weight of 22 g/m$^2$ was produced on both sides of the paperboard.

Example 6

The procedure of Example 5 was followed with the exception that the weight of each of the extruded polymeric layers was 10 g/m$^2$ so that a two-layer coating with the total weight of 20 g/m$^2$ was produced on both sides of the paperboard.

Reference Material

One side of a three-layer paperboard with a weight of 295 g/m$^2$ and propagation speed of 300 m/min was extruded with Eastapak PET copolyester 9921 to produce a one-layer coating. The extrusion temperature was 290° C. and the air gap in extrusion was 18 cm. The weight of the extruded layer was 22 g/m$^2$.

Tearing Tests

The adhesion of the coating was evaluated from the coated paperboards produced in accordance with Examples 1–4 and the reference material by tearing off the polymeric coating from dry paperboard. The evaluation took place on a scale of 1–6, in which the best value 1 represented a 100% fibre tear, the surface of the polymeric coating torn off the paperboard then being totally covered by fibres, the poorest value 6 representing missing adhesion, in which case the surface of the coating torn off from the paperboard was clear, without adhered fibres. The value 6 indicates a rejected result, while the value 5 again is still sufficient to keep the coating adhered to the paperboard as the paperboard is being processed into a food dish.

Further, wet adhesion was evaluated from the same materials by soaking the paperboard samples in room-temperature water and by tearing off the polymeric coating from the completely waterlogged paperboard. The scale was 1–3, the values 1 and 2 representing an approved and the value 3 a rejected result.

The test results have been shown in the following Table 1.

TABLE I

| Material | Dry adhesion | Wet adhesion |
|---|---|---|
| Example 1 | 1 | 1 |
| Example 2 | 1 | 1 |
| Example 3 | 3 | 2 |
| Example 4 | 4 | 2 |
| Reference material | 6 | 3 |

Processing into an Oven Dish and Heating Tests

Oven dishes were manufactured of paperboards with polymeric coatings in accordance with Examples 1–4 by stamping a paperboard with a moisture rate of 11% by a hydraulic compression tool, the temperature of which was 200° C. The dishes thus obtained were then kept in an oven with a temperature of 230° C. for 30 minutes.

In stamping, the paperboard is placed into a high temperature for a short time, the moisture contained in the paperboard evaporating and generating a pressure which may remove some of the coating. Also in an oven there is the danger of gas bubbles forming beneath the coating and the coating unsticking. In the tests carried out, the paperboards in accordance with Examples 1–4, however, withstood the stamping and heating in an oven without any signs of the coating unsticking or of some other damages.

Heat Sealing Tests

Drinking cups were manufactured of paperboards coated on both sides with polymer according to Examples 5 and 6 by heat sealing at a sealing temperature of 250° C. Risk factors in the joint sealing are that the joints remain leaking or that pin holes will exist in the area of joints in the coating layer, due to heating.

Sealability was evaluated by filling the cups with a test liquid containing approx. 50% of water, approx. 50% of ethanol and a small amount of colouring agent, the penetration of which into the paperboard is an easily observable sign of failed sealing. In the test, no leaks were observed in the joints of neither cup manufactured of the cardboard of the example.

It is obvious for one skilled in the art that the applications of the invention are not limited to the above examples, but they may vary within the scope of the following patent claims.

We claim:

1. A coated food paperboard comprising one or several fiber material layers and a heat-resistant polymeric coating getting into contact with food, said coating consisting of superimposed polymeric layers comprising an outer layer, the melting point of the polymer of which is at least 230° C., and an inner layer placed against the fiber material layer, to achieve adhesion between the coating and the fiber material, characterized in that the inner layer comprises a first polymer with a melting point of at least 230° C., blended with a second polymer which is an adhesive polymer with a melting point of 130–185° C. in a ratio of 85–97% by weight of said first polymer and 3–15% by weight of said second polymer.

2. Paperboard according to claim 1, characterized in that the polymer of the outer layer and the one of the polymers of the inner layer are of the same polymeric material.

3. Paperboard according to claim 2, characterized in that the outer layer of the coating is polyethylene terephthalate, and the inner layer is a mixture of polyethylene terephthalate and a terephthalate-based copolyester with a lower melting point.

4. Paperboard according claim 1 characterized in that the total weight of the polymeric coating is at most 25 g/m².

5. Paperboard according to claim 4, wherein the total weight of the polymeric coating is 15–22 g/m².

6. Paperboard according to claim 1, characterized in that the inner layer of the coating further has blended in it fine mineral substance.

7. Paperboard according to claim 6, characterized in that the total weight of the coating is at most 25 g/m² by weight.

8. Paperboard according to claim 7, wherein the total weight of the coating is 13–22 g/m².

9. Paperboard according to claim 1, characterized in that the inner layer comprises 80–90% by weight of polymer with a melting point of at least 230° C., 3–10% by weight of polymer with a melting point of 130–185° C., and 5–15% by weight of mineral substance.

10. Paperboard according to claim 5 or 9, characterized in that the mineral substance is calcium carbonate.

11. Paperboard according to claim 10, characterized in that the outer layer of the coating is polyethylene terephthalate and the inner layer is a mixture of polyethylene terephthalate, a terephthalate-based copolymer with a lower melting point, and calcium carbonate.

12. Paperboard according to claim 1, characterized in that the fiber material layers comprise a three-layer structure, in which the middlemost layer is a thicker layer consisting of a mixture of chemical pulp and CTMP, the thinner layers on both sides of it consisting essentially of pure chemical pulp.

13. A method for manufacturing a coated paperboard according to claim 1, characterized in that the polymer forming the outer layer of the coating and the polymeric mixture forming the inner layer are coextruded together onto a moving paperboard web.

14. A heat-resistant oven board comprising the coated food paperboard of claim 1.

15. A consumer package shaped as a dish for heatable food comprising the coated food paperboard of claim 1.

16. A liquid packaging board comprising the coated food paperboard of claim 1.

17. An oven dish, characterized in that it has been manufactured of the paperboard according to claim 1 so that the polymeric coating of the paperboard is attached to the interior surface of the dish.

18. An oven dish according to claim 17, characterized in that it has been manufactured of paperboard by compression.

19. An oven dish according to claim 17, characterized in that it has been manufactured of paperboard by folding and joint sealing the folds thus produced to the exterior surface of the dish.

20. A heatable food package, characterized in that it comprises the oven dish according to one of the claims 17–19, food intended to be heated in the dish, and a removable protective cover or wrapping closing the dish.

21. A coated food paperboard comprising one or more fiber material layers and a heat-resistant polymeric coating for contacting food, said heat-resistant polymeric coating comprising superimposed polymeric layers comprising an outer polymeric layer for contacting food, wherein the melting point of the polymer of the outer polymeric layer is at least 230° C., and an inner adhesive layer in direct contact with the outer layer and placed against the fiber material layer in order to achieve adhesion between the coating and the fiber material, characterized in that the inner layer comprises a first polymer with a melting point of at least 230° C., blended with a second polymer which is an adhesive polymer with a melting point of 130–185° C. in a ratio of 85–97% by weight of said first polymer and 3–15% by weight of said second polymer.

* * * * *